US009372657B2

(12) United States Patent
Ueda et al.

(10) Patent No.: US 9,372,657 B2
(45) Date of Patent: Jun. 21, 2016

(54) MULTI-SCREEN DISPLAY SYSTEM, DISPLAY DEVICE, ID SETTING APPARATUS, AND ID SETTING METHOD

(75) Inventors: Kazushi Ueda, Tokyo (JP); Masayuki Terao, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 17 days.

(21) Appl. No.: 14/406,744

(22) PCT Filed: Jun. 11, 2012

(86) PCT No.: PCT/JP2012/064911
§ 371 (c)(1),
(2), (4) Date: Dec. 9, 2014

(87) PCT Pub. No.: WO2013/186835
PCT Pub. Date: Dec. 19, 2013

(65) Prior Publication Data
US 2015/0153994 A1    Jun. 4, 2015

(51) Int. Cl.
| | |
|---|---|
| G09G 5/00 | (2006.01) |
| G05B 19/18 | (2006.01) |
| G06F 3/00 | (2006.01) |
| G06F 3/14 | (2006.01) |
| G06T 1/20 | (2006.01) |
| G06T 1/60 | (2006.01) |
| H04W 4/00 | (2009.01) |

(52) U.S. Cl.
CPC .............. *G06F 3/1446* (2013.01); *G06T 1/20* (2013.01); *G06T 1/60* (2013.01); *G09G 5/006* (2013.01); *H04W 4/008* (2013.01); *G09G 2320/08* (2013.01); *G09G 2370/042* (2013.01); *G09G 2370/16* (2013.01)

(58) Field of Classification Search
CPC ....... G06F 3/1446; H04W 4/008; G06T 1/20; G06T 1/60; G09G 5/006; G09G 2370/16; G09G 2370/042; G09G 2320/08
USPC .................................. 345/156–178; 710/3, 9
See application file for complete search history.

(56) References Cited

U.S. PATENT DOCUMENTS

| | | | | |
|---|---|---|---|---|
| 5,987,532 | A * | 11/1999 | Tokui ................... | G06F 3/1423 340/9.1 |
| 8,214,059 | B1 * | 7/2012 | Petrocy .................. | G09F 11/22 340/3.5 |
| 2011/0296055 | A1 * | 12/2011 | Kim ...................... | G06F 3/1423 710/3 |

FOREIGN PATENT DOCUMENTS

| | | |
|---|---|---|
| JP | 2004-219869 A | 8/2004 |
| JP | 2011-175626 A | 9/2011 |
| JP | 2011-247917 A | 12/2011 |

OTHER PUBLICATIONS

International Search Report (ISR) (PCT Form PCT/ISA/210), in PCT/JP2012/064911, dated Sep. 11, 2012.

*Primary Examiner* — Amit Chatly
(74) *Attorney, Agent, or Firm* — McGinn IP Law Group, PLLC

(57) ABSTRACT

When assigning display IDs to displays which form a multi-screen system, the displays are arranged such that short distance radio communication is possible and an ID setting apparatus which can perform the short distance radio communication is employed. After each display ID is set in the ID setting apparatus, the ID setting apparatus and each of the displays are placed near each other in a contactless manner so as to transfer the display ID set in the ID setting apparatus to the display and assign the display ID to the display.

1 Claim, 11 Drawing Sheets

MULTI-SCREEN DISPLAY SYSTEM, DISPLAY DEVICE, ID SETTING APPARATUS, AND ID SETTING METHOD

TECHNICAL FIELD

The present invention relates to a multi-screen display system, a display device, an ID setting apparatus, and an ID setting method.

BACKGROUND ART

A large screen display called a "public display" is utilized when displaying the departure and arrival times of airplanes at an airport, the departure and arrival times of trains at a station, or advertisements for commercial goods at an entrance or a shop window of a large store. Such a public display can form a multi-screen system that includes two-dimensionally arrayed displays so as to implement large screen video imaging.

Additionally, in recent years, a technique for short distance radio communication, called "NFC (Near Field Communication)", is getting a lot of attention. The NFC is compatible with contactless IC cards and data communication is possible by only placing devices, each of which is equipped with an NFC card or chip, near each other. For example, Patent Document 1 discloses a display with such an NEC element.

PRIOR ART DOCUMENT

Patent Document

Patent Document 1: Japanese Unexamined Patent Application, First Publication No. 2011-175626.

DISCLOSURE OF INVENTION

Problem to be Solved by the Invention

As described above, the public display can implement the large screen video imaging by means of the multi-screen system. However, since the multi-screen system includes nearly arranged displays, a plurality of displays simultaneously respond to an operation signal from a single remote controller. For such a problem, some public displays can assign display IDs (ID values) to the individual displays (of each public display). When utilizing the display ID, only a desired display can be operated with no influence on the other displays. Generally, when shipping displays from a factory, display IDs thereof have an equivalent value as an initial value. After installing each display, the user thereof performs the setting of the display ID by operating a remote controller.

However, in a multi-screen system, when the user operates the remote controller to set the display ID, a plurality of displays respond thereto. Therefore, in order to set the display ID, the user must repeat a process of switching on each display and making the display store an assigned display ID. Such a display ID setting operation considerably requires a user's effort.

In addition, each display must be switched on to assign the display ID thereto. Here, the power-on operation must be performed in a state conformable to the operation condition of the relevant display. Therefore, it is difficult to perform the ID setting when the displays are laid on a floor before the installation.

In light of the above circumstances, an object of the present invention is to provide a multi-screen display system, a display device, an ID setting apparatus, and an ID setting method, by which the display ID setting can be easily performed even in a multi-screen configuration.

Means for Solving the Problem

In order to solve the above-described problem, a multi-screen display system according to the present invention includes a plurality of display devices and an ID setting apparatus, wherein:
the ID setting apparatus comprises:
a generation unit that generates display IDs; and
a first short distance radio communication unit that transmits the display IDs generated by the generation unit to the display devices via short distance radio communication; and
each display device comprises:
a second short distance radio communication unit that receives the relevant display ID from the ID setting apparatus via the short distance radio communication; and
a storage unit that stores the received display ID.

In addition, a display device in a multi-screen display system, according to the present invention, includes a plurality of display devices and an ID setting apparatus, wherein the display device comprises:
a short distance radio communication unit that receives a display ID generated by the ID setting apparatus via said ID setting apparatus and short distance radio communication; and
a storage unit that stores the received display ID.

Additionally, an ID setting apparatus in a multi-screen display system, according to the present invention, includes a plurality of display devices and the ID setting apparatus, wherein the ID setting apparatus comprises:
a generation unit that generates display IDs; and
a short distance radio communication unit that transmits the display IDs generated by the generation unit to the display devices via short distance radio communication.

Furthermore, an ID setting method utilized in a multi-screen display system, according to the present invention, includes a plurality of display devices and the ID setting apparatus, wherein:
the ID setting apparatus:
generates display IDs; and
transmits the generated display IDs to the display devices via short distance radio communication; and
each display device:
receives the relevant display ID from the ID setting apparatus via the short distance radio communication; and
stores the received display ID.

Effect of the Invention

According to the present invention, the individual display devices are arranged in a manner such that short distance radio communication is possible and an ID setting apparatus which can perform the short distance radio communication is employed. After a display ID (value) is set in the ID setting apparatus, the ID setting apparatus and each relevant display device are placed near each other in a contactless manner so as to transfer the display ID set in the ID setting apparatus to the display device and assign the display ID to the display device. Accordingly, display IDs can be easily set even when employing a multi-screen configuration.

MODE FOR CARRYING OUT THE INVENTION

Figure 1:
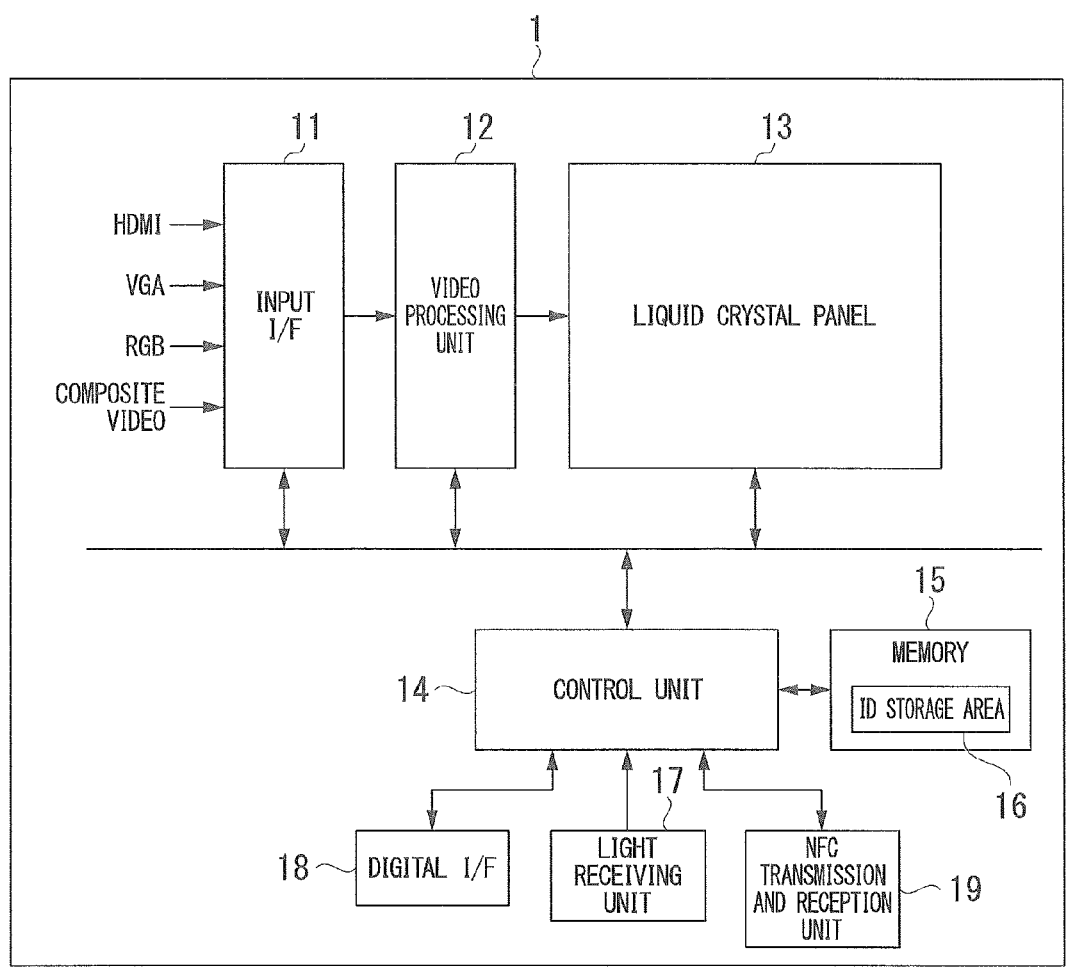
FIG. 1 is a block diagram that shows the structure of a display pertaining to the present invention.

Below, embodiments of the present invention will be explained in detail with reference to the drawings. FIG. 1 is a block diagram that shows the structure of a display 1 pertaining to the present invention.

In FIG. 1, an input interface 11 has input a plurality of input terminals such as an HDMI (High Definition Multimedia Interface) input terminal, a VGA (Video Graphics Array) input terminal, an RGB (red, green, blue) input terminal, and a composite video terminal. Switching of a video signal from the input interface 11 is controlled by a control unit 14 and the video signal is supplied to a video processing unit 12.

The video processing unit 12 performs a Y/C separation (separation of a luminance signal and a chroma signal from each other) process, a process of converting a composite video signal to a component signal, an I/P conversion (conversion from an interlaced signal to a progressive signal) process, and the like. A signal output from the video processing unit 12 is supplied to a liquid crystal panel 13. The liquid crystal panel 13 is a large-screen liquid crystal panel and displays an image based on a video signal from the video processing unit 12.

The control unit 14 is formed utilizing a CPU (Central Processing Unit) or the like and controls the entire part of the display. A memory 15 is provided for the control unit 14 and includes an ID storage area 16.

In addition, an infrared light receiving unit 17 is provided for the control unit 14. The light receiving unit 17 receives an infrared command signal and supplies it to the control unit 14. Based on the command signal, the control unit 14 performs various operational settings. When a display ID is stored in the ID storage area 16, the control unit 14 executes a process of accepting a command only for a command signal from a specific remote controller associated with the display ID.

Addition, a digital interface 18 is provided for the control unit 14. The digital interface 18 may be an RS232C interface or a USB (Universal Serial Bus). In the display 1 pertaining to the present invention, the entire multi-screen system can be controlled by accessing a LAN (Local Area Network) via the digital interface 18.

Furthermore, an NFC transmission and reception unit 19 is provided for the control unit 14. The NFC transmission and reception unit 19 performs short distance radio communication with an NFC-compatible portable terminal or IC card so as to communicate information. The short distance radio communication is radio communication that is internationally standardized as NFC (Near Field Communication) and low power radio communication performed within a distance of ten and a few centimeters. The NFC is compatible with a contactless IC card, and data communication between devices, each of which carries an NFC card or chip, is possible by only placing the devices near each other.

Figure 2:
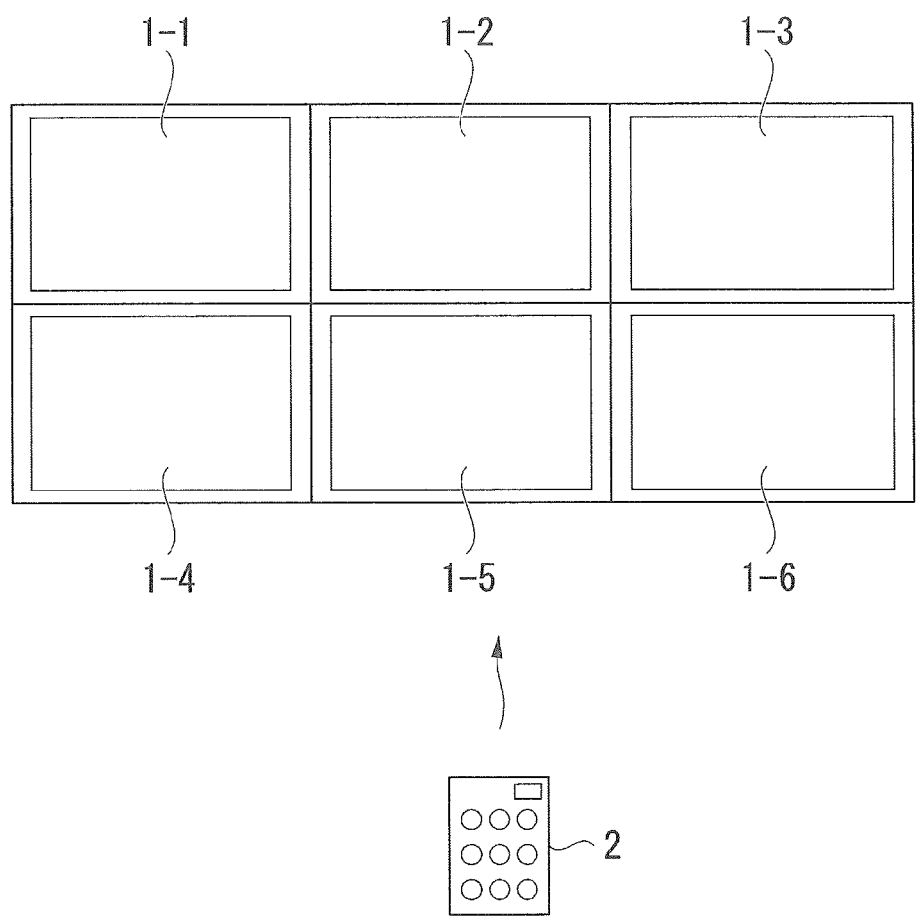
FIG. 2 is a diagram showing the structure of a multi-screen system formed utilizing displays in an embodiment.

A multi-screen system can be implemented utilizing the display 1 of the present embodiment. FIG. 2 shows the structure of a formed multi-screen system. In the shown example, a total of the six displays 1-1 to 1-6 are arranged (three in the horizontal direction and two in the vertical direction) to form the multi-screen system. The multi-screen system displays an image by handling a plurality of displays (here, six displays) 1-1 to 1-6 as one large display so that an impressive video can be reproduced on a large screen.

Next, the display ID will be explained. As shown in FIG. 2, the displays 1 of the present embodiment can form a multi-screen system. However, when forming the multi-screen system, the displays 1-1 to 1-6 simultaneously respond to an infrared command signal from a remote controller 2.

In the present embodiment, an individual display ID can be assigned to each of the displays 1-1 to 1-6. According to the display ID, the target display for the setting utilizing the remote controller 2 can be identified. Therefore, only a desired display can be operated with no influence on the other displays. As described above, the assigned display ID is stored in the ID storage area 16 of the memory 15.

Additionally, in the present embodiment, the above display ID setting can be performed utilizing an ID setting device (e.g., a portable terminal or a remote control device) that can execute the NFC, which can improve the display ID setting operation. That is, when shipping the displays 1-1 to 1-6 in FIG. 2 from a factory, an equivalent value is assigned to each display as the initial value of the display ID. If the user tries to assign an individual display ID to each of the displays 1-1 to 1-6 by operating the remote controller 2, all displays 1-1 to 1-6 respond thereto. Therefore, in order to assign an individual display ID to each of the displays 1-1 to 1-6, the displays 1-1 to 1-6 must be switched on in turn, which degrades the operability of the system. In the present embodiment, the operability is improved by performing the display ID setting via a portable terminal that can execute the NFC.

Figure 3:
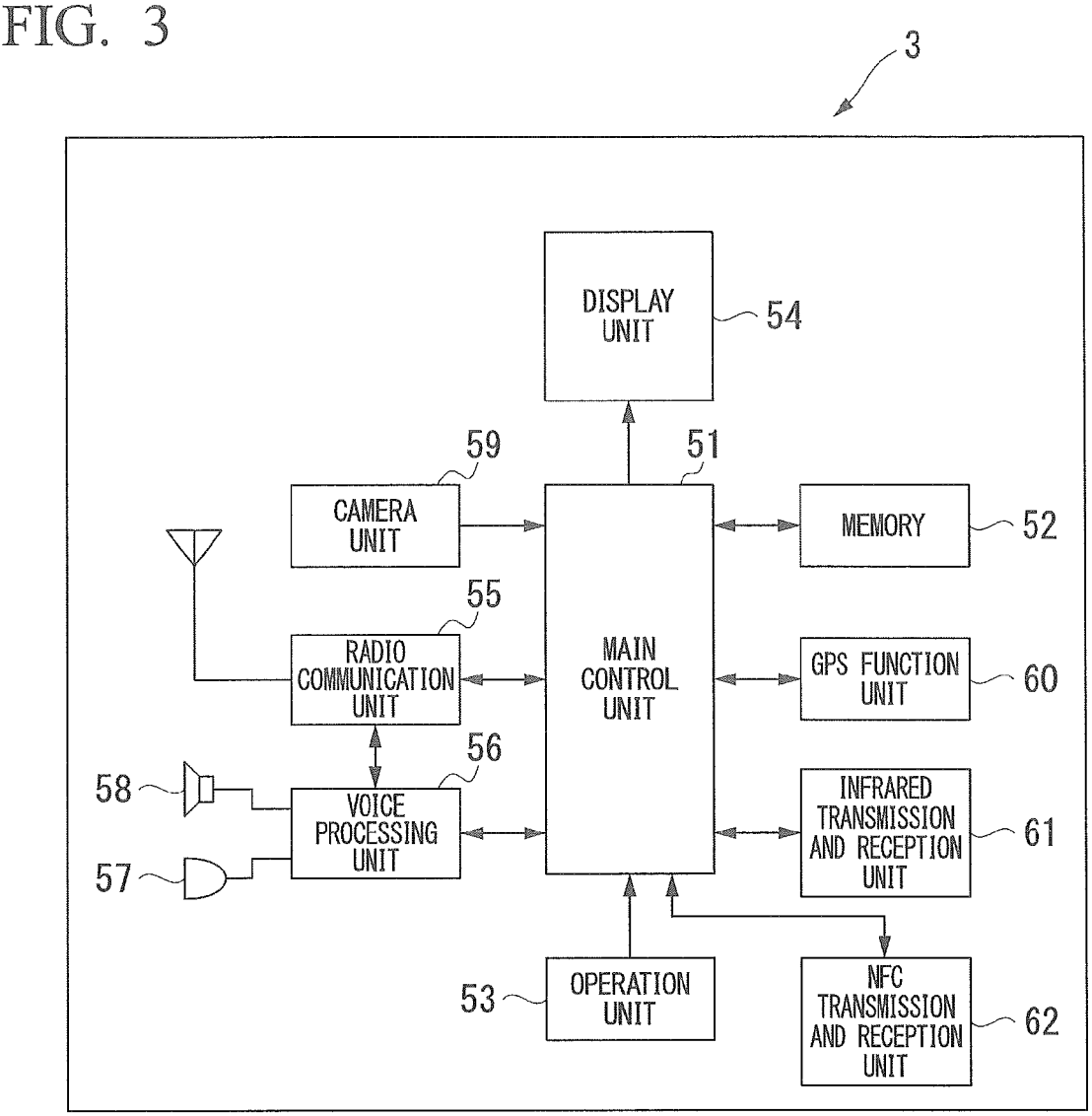
FIG. 3 is a block diagram of an example of a portable terminal that can be utilized in an embodiment of the present invention.

Below, the portable terminal that can execute the NFC will be explained. FIG. 3 is a block diagram of an example of a portable terminal 3 that can be utilized in the present embodiment and can execute the NFC.

In FIG. 3, a main control unit 51 is formed utilizing a CPU (Central Processing Unit) or the like and controls the entire portable terminal 3. A memory 52 stores a boot program, a basic program, and various application programs which include a display ID setting program.

An operation unit 53 accepts an input operation from the user and includes ten keys, cursor keys, an enter (or determination) key, function keys, and the like. A display unit 54 is formed utilizing a liquid crystal display, and various characters or images are displayed on the display unit 54.

A radio communication unit 55 performs radio communication together with a base station. The communication system employed here may be a PDC (Personal Digital Cellular) system, GSM (registered trademark: Global System for Mobile Communication), CDMA (Code Division Multiple Access), WCDMA (Wideband CDMA), or LTE (Long Term Evolution). A microphone 57 and a speaker 58 are utilized in telephone communication when using a telephone function. A voice processing unit 56 processes an input voice signal or an output voice signal.

A camera unit 59 performs camera photographing. The camera unit 59 includes an optical system that has a lens and the like, an imaging part that employs an image sensor such as a CCD (Charge Coupled Device), and a video signal processing part that processes an imaging signal from the image sensor.

A GPS (Global Positioning System) function unit 60 receives radio waves from a plurality of satellites so as to determine the present location.

An infrared transmission and reception unit 61 performs infrared communication. The display 1 can be operated utilizing this infrared communication.

An NFC transmission and reception unit 62 performs short distance radio communication with any NFC-compatible portable device so as to communicate information. The portable terminal 3 of the present embodiment can perform contactless communication utilizing the NFC transmission and reception unit 62, together with the NFC transmission and reception unit 19 in the display 1.

As described above, the display 1 of the present embodiment has the NFC transmission and reception unit 19 and the portable terminal 3 of the present embodiment has the NFC transmission and reception unit 62. The display IDs (i.e., ID values) can be set in a contactless manner by means of the NFC. Therefore, the display IDs can be easily set even when establishing a multi-screen system.

Figure 4A:
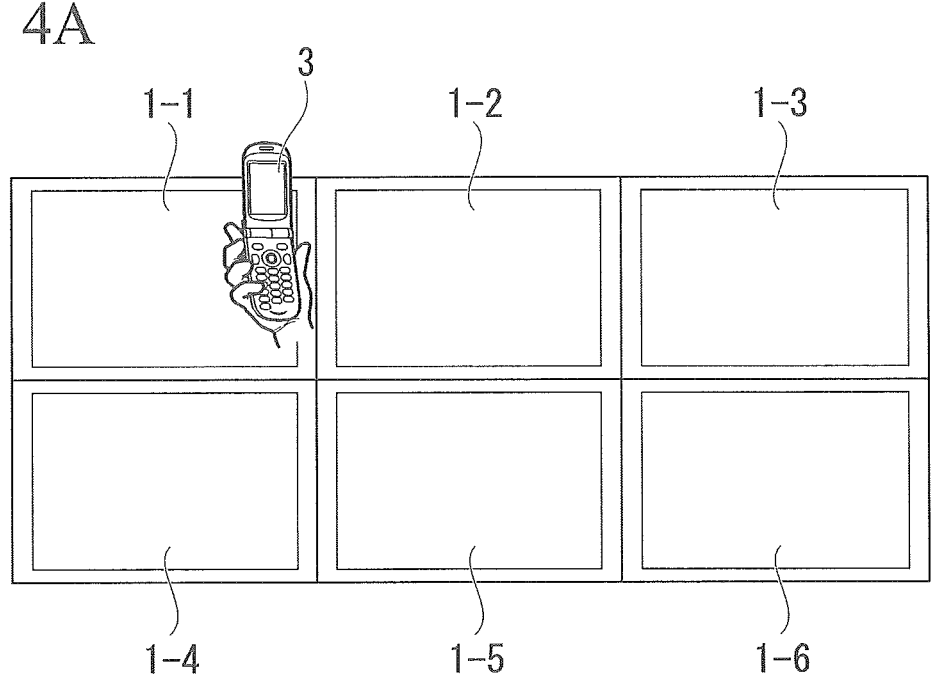
FIG. 4A is a diagram to explain a general operation of assigning a display ID to each of the displays in a multi-screen system.
Figure 4B:
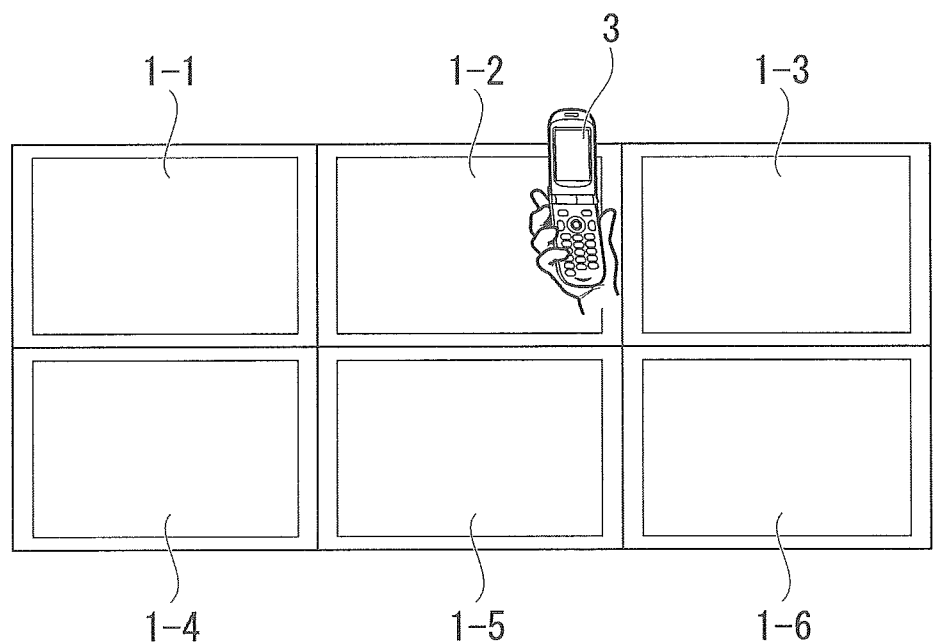
FIG. 4B is also a diagram to explain the general operation of assigning a display ID to each of the displays in the multi-screen system.

FIGS. 4A and 4B are diagrams to explain a general operation of assigning a display ID to each of the displays 1-1 to 1-6 in the multi-screen system, by using the portable terminal 3.

As shown in FIG. 4A, the user first inputs a display ID into the portable terminal 3 and brings the portable terminal 3 within a region where the short distance radio communication with the display 1-1 is possible. Accordingly, data transfer is performed between the NFC transmission and reception unit 62 of the portable terminal 3 and the NFC transmission and reception unit 19 of the display 1-1 by means of the short distance radio communication so that the display ID input into the portable terminal 3 is sent to the display 1-1 and is assigned thereto.

Next, as shown in FIG. 4B, the user inputs a display ID, that differs from the previous display ID, into the portable terminal 3 and brings the portable terminal 3 close to the display 1-2. Accordingly, data transfer is performed between the NFC transmission and reception unit 62 of the portable terminal 3 and the NFC transmission and reception unit 19 of the display 1-2 by means of the short distance radio communication so that the display ID input into the portable terminal 3 is sent to the display 1-2 and is assigned thereto.

A similar operation is repeated so that individual display IDs are assigned to the displays 1-1 to 1-6.

Figure 5:
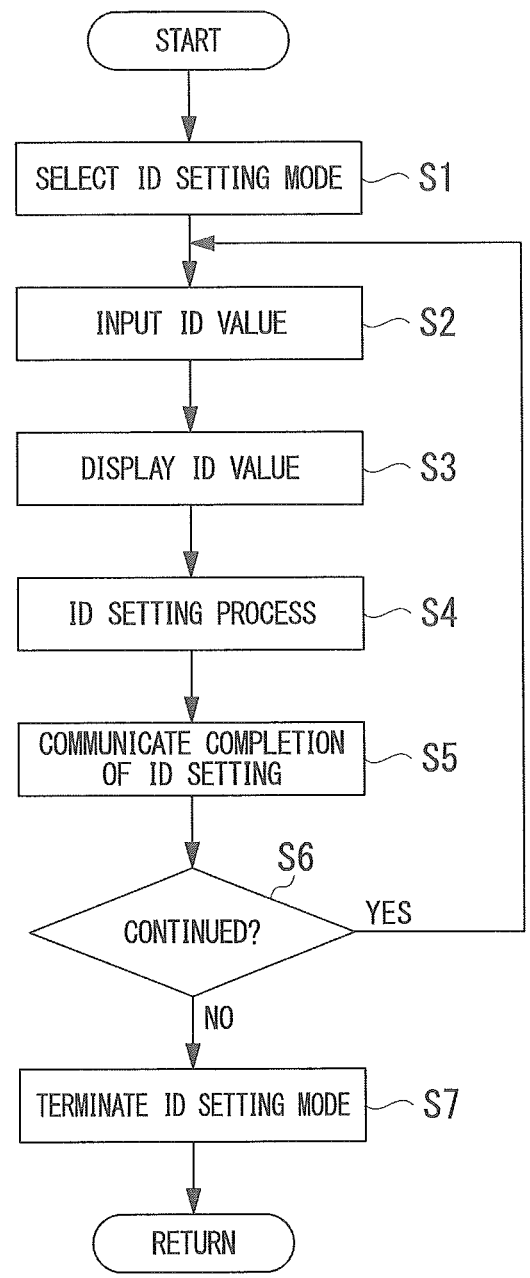
FIG. 5 is a flowchart in a first embodiment of the present invention, which shows the operation of the portable terminal for setting the display ID.

FIG. 5 is a flowchart in a first embodiment of the present invention, which shows the operation of the portable terminal 3 for setting the display IDs of the displays 1-1 to 1-N that form the multi-screen system.

In FIG. 5, the user selects an ID setting mode (see step S1) and inputs a display ID by operating the operation unit 53 (see step S2). After the display ID is input, the main control unit 51 displays the input value of the display ID on the display unit 54 (see step S3). When the user brings the portable terminal 3 close to the display 1-1, the short distance radio communication is performed between the NFC transmission and reception unit 62 of the portable terminal 3 and the NFC transmission and reception unit 19 of the display 1-1 so that the display ID input in step S2 is transferred to the display 1-1 and the display ID setting process is executed (see step S4).

After completing the display ID setting, the main control unit 51 informs the user of the completion of the setting by means of information display or sound (see step S5). Then the main control unit 51 determines whether or not the display ID setting process is to be continued, based on a user input operation (see step S6). If the display ID setting process is continued (i.e., "YES" in step S6), the operation is returned to step S2. If the display ID setting process is not continued (i.e., "NO" in step S6), the ID setting mode is terminated (see step S7).

Figure 6:
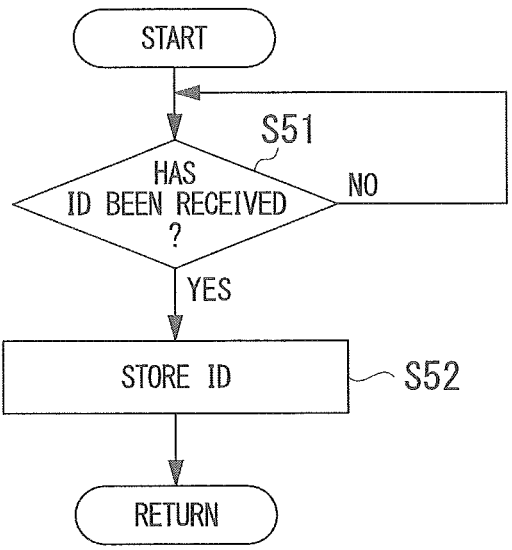
FIG. 6 is a flowchart in the first embodiment of the present invention, which shows the operation of the display for setting the display ID.
Figure 7:
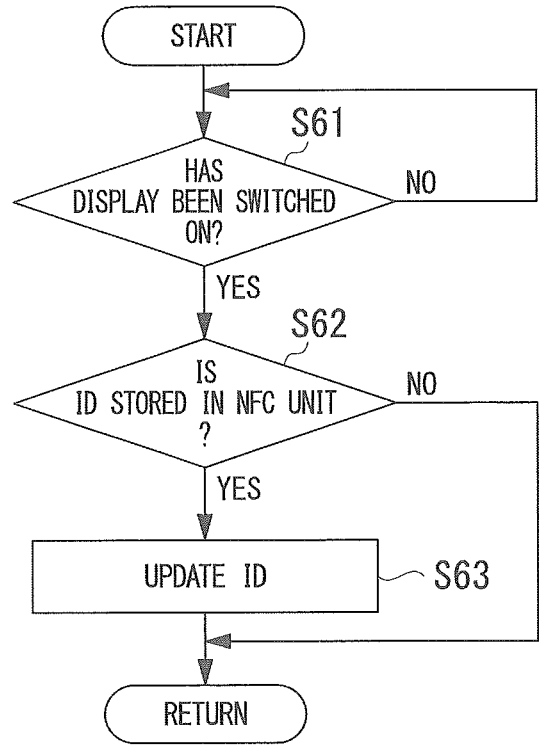
FIG. 7 is also a flowchart in the first embodiment of the present invention, which shows the operation of the display for setting the display ID.

FIGS. 6 and 7 are flowcharts which show the operations of displays 1-1 to 1-N, that implement a multi-display connection, when assigning individual display IDs to the displays 1-1 to 1-N by using the portable terminal 3.

In FIG. 6, when the user brings the portable terminal 3 close to the display 1-1, the relevant NFC transmission and reception unit 19 in the displays 1-1 to 1-N receives the display ID sent from the displays 1-1 to 1-N (see step S51) and stores the display ID in the NFC transmission and reception unit 19 (see step S52).

As shown in FIG. 7, when the displays 1-1 to 1-N are switched on (see step S61), each control unit 14 thereof determines whether or not a display ID is stored in the corresponding NFC transmission and reception unit 19 (see step S62). If a display ID is stored (i.e., "YES" in step S62), the control unit 14 utilizes this display ID to update the display ID stored in the ID storage area 16 in the memory 15 and the control operation returns to an ordinary process. If no display ID is stored in step S62 (i.e., "NO" in step S62), the operation of the control unit 14 directly returns to the ordinary process.

As described above, in the present embodiment, even when a multi-screen system is formed, each display ID can be easily set only by inputting the display ID into the portable terminal 3 and bringing it close to the relevant display among 1-1 to 1-N. In addition, NFC communication is performed only when the relevant devices are close to each other, for example, by approximately 10 centimeters. Therefore, even when a multi-screen system is formed, ID setting of each individual display is possible.

Second Embodiment

Figure 8:
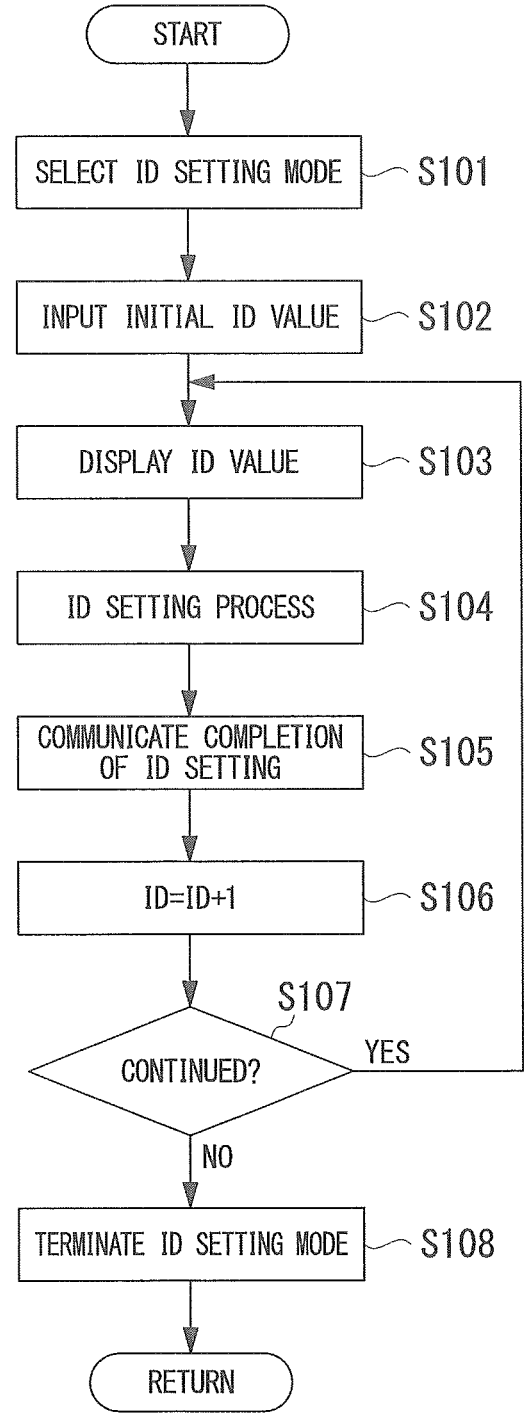
FIG. 8 is a flowchart in a second embodiment of the present invention, which shows the operation of the portable terminal for setting the display ID.

Next, a second embodiment of the present invention will be explained. FIG. 8 is a flowchart in the second embodiment of the present invention, which shows the operation of the portable terminal 3 for setting the display IDs of the displays 1-1 to 1-N that form the multi-screen system. As shown in FIG. 5, in the above-described first embodiment, when assigning display ID values to the individual displays 1-1 to 1-N connected in a multi-display form, the user performs an input operation to assign an display ID to each of the displays 1-1 to 1-N. In contrast, in the present embodiment, different display IDs can be assigned to the individual displays 1-1 to 1-N with no user's ID input operation.

In FIG. 8, the user selects an ID setting mode (see step S101) and inputs an initial value of the display ID by operating the operation unit 53 (see step S102). After the relevant display ID is input, the main control unit 51 displays the input value of the display ID on the display unit 54 (see step S103). When the user brings the portable terminal 3 close to the display 1-1, the short distance radio communication is performed between the NFC transmission and reception unit 62 of the portable terminal 3 and the NFC transmission and reception unit 19 of the display 1-1 so that the display ID is transferred to the display 1-1 and the display ID setting process is executed (see step S104). Here, in this first turn, the initial value of the display ID, which was input in step S102, is transferred to the display 1-1.

After completing the display ID setting, the main control unit 51 informs the user of the completion of the setting by means of information display or sound (see step S105). Then the main control unit 51 increases the value of the display ID by only 1 (see step S106). For example, if the value of the display ID input in step S102 is 1, the value of the display ID is set to 2 (i.e., 1+1) according to step S106. Then the main control unit 51 determines whether or not the display ID setting process is to be continued, based on a user input operation (see step S107). If the display ID setting process is continued (i.e., "YES" in step S107), the operation is returned to step S103.

Next, the main control unit 51 displays the value (here, 2) of the display ID, which was increased in step S105, on the display unit 54 (see step S103). When the user brings the portable terminal 3 close to the display 1-2, the short distance radio communication is performed between the NFC transmission and reception unit 62 of the portable terminal 3 and the NFC transmission and reception unit 19 of the display 1-1 so that the display ID is transferred to the display 1-2 and the display ID setting process is executed (see step S104).

After completing the display ID setting, the main control unit 51 informs the user of the completion of the setting by means of information display or sound (see step S105). Then the main control unit 51 increases the value of the display ID by only 1 (see step S106). According to this step, the value of the display ID is set to 3 (i.e., 2+1). Then the main control unit 51 determines whether or not the display ID setting process is to be continued, based on a user input operation (see step S107). If the display ID setting process is continued (i.e., "YES" in step S107), the operation is returned to step S103.

Such an operation is repeated so that display IDs (ID="1", ID="2", ID="3", ...) are respectively assigned to the displays 1-1, 1-2, 1-3, .... If the display ID setting process is not continued in step S107 (i.e., "NO" in step S107), the ID setting mode is terminated (see step S108).

Third Embodiment

Figure 9:
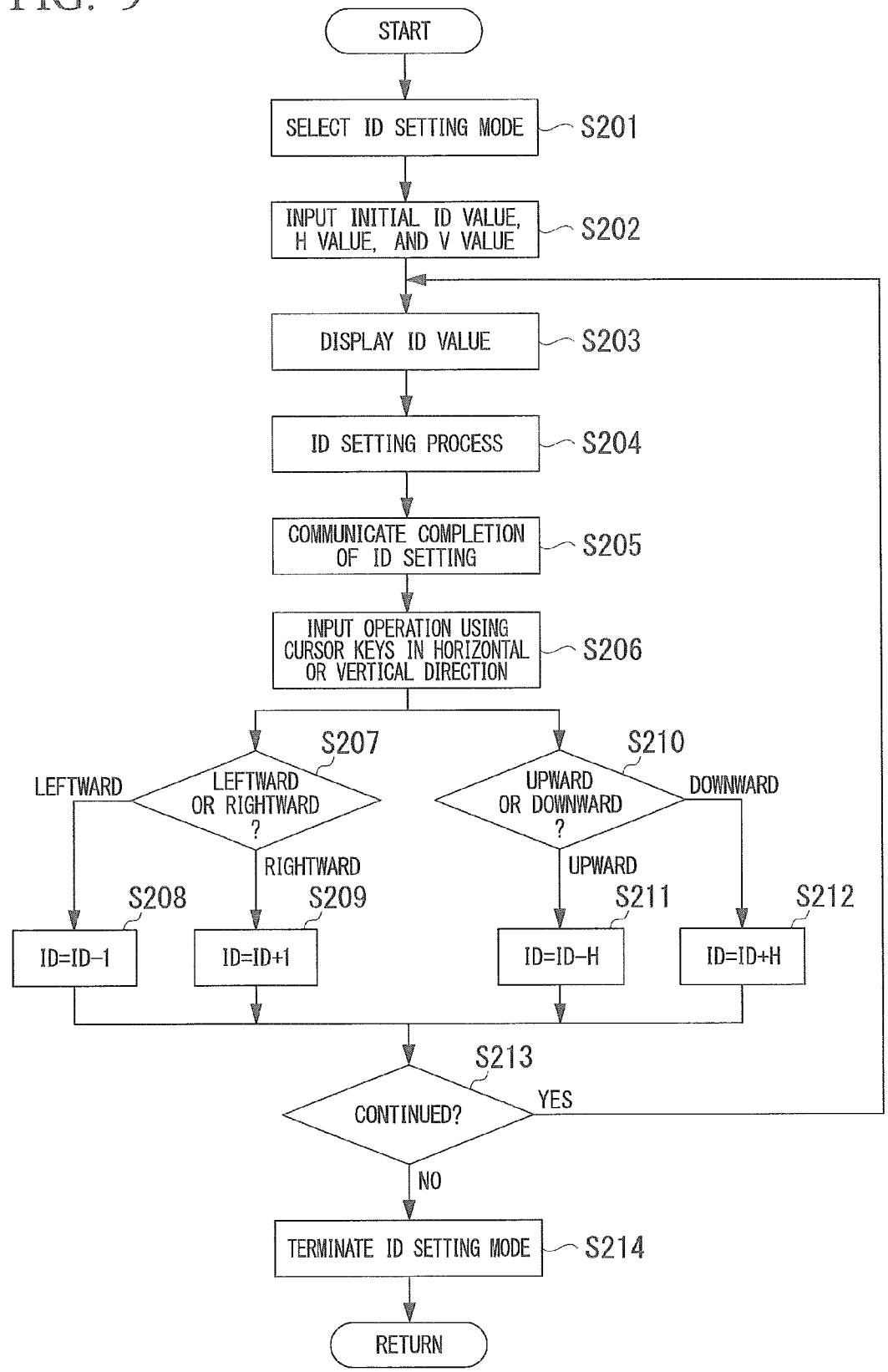
FIG. 9 is a flowchart in a third embodiment of the present invention, which shows the operation of the portable terminal for setting the display ID.

Next, a third embodiment of the present invention will be explained. FIG. 9 is a flowchart in the third embodiment of the present invention, which shows the operation of the portable terminal 3 for setting the display IDs of the displays 1-1 to 1-N that form the multi-screen system. In the above-described second embodiment, values of the display ID can be set, in turn, to a plurality of display IDs 1-1 to 1-N which form a multi-screen system. In the present third embodiment, values of the display ID can be set to a plurality of display IDs 1-1 to 1-N arranged in a two-dimensional form, where the ID values are associated with individual positions in the arrangement.

In FIG. 9, the user selects an ID setting mode (see step S201) and inputs an initial value of the display ID, the number H of the displays arranged in the horizontal direction, and the number V of the displays arranged in the horizontal direction by operating the operation unit 53 (see step S202). For example, if displays 1-1 to 1-6 are arranged in a manner such that there are three displays in the horizontal direction and two displays in the vertical direction (see FIG. 2), the user inputs "3" for H and "2" for V in step S202.

After the relevant display ID is input, the main control unit 51 displays the input value of the display ID on the display unit 54 (see step S203). When the user brings the portable terminal 3 close to the display 1-1, the short distance radio communication is performed between the NFC transmission and reception unit 62 of the portable terminal 3 and the NFC transmission and reception unit 19 of the display 1-1 so that the initial value of the display ID (input in step S202) is transferred to the display 1-1 and the display ID setting process is executed (see step S204). After completing the display ID setting, the main control unit 51 informs the user of the completion of the setting by means of information display or sound (see step S205).

When receiving the information that indicates the completion of the setting (see step S205), the user operates the cursor keys of the operation unit 53 in the horizontal and vertical directions so as to determine a target display for the next setting. If selecting a display positioned on the right or left side of the present display which has been processed, the user operates the cursor keys in the horizontal direction. If selecting a display positioned on the upper or lower side of the present display, the user operates the cursor keys in the vertical direction (see step S206).

If the cursor keys are operated in the horizontal direction, the main control unit 51 determines whether the cursor keys have been operated leftward or rightward (see step S207). When the cursor keys have been operated leftward, the main control unit 51 decreases the value of the display ID by only 1 (see step S208). When the cursor keys have been operated rightward, the main control unit 51 increases the value of the display ID by only 1 (see step S209).

If the cursor keys are operated in step S206 in the vertical direction, the main control unit 51 determines whether the cursor keys have been operated upward or downward (see step S210). When the cursor keys have been operated upward, the main control unit 51 decreases the value of the display ID by the number H of the displays in the horizontal direction, which was set in step S202 (see step S211). When the cursor keys have been operated downward, the main control unit 51 increases the value of the display ID by the number H of the displays in the horizontal direction (see step S212).

Then the main control unit 51 determines whether or not the display ID setting process is to be continued, based on a user input operation (see step S213). If the display ID setting process is continued (i.e., "YES" in step S213), the operation is returned to step S203. If the display ID setting process is not continued (i.e., "NO" in step S213), the ID setting mode is terminated (see step S214).

As described above, in the present embodiment, when cursor keys are operated horizontally, the value of the display ID is increased or decreased by only 1, and when cursor keys are operated vertically, the value of the display ID is increased or decreased by only the number H of the displays in the horizontal direction. In an example case in which displays 1-1 to 1-6 are arranged in a manner such that there are three displays in the horizontal direction and two displays in the vertical direction (see FIG. 2), when the cursor keys are operated horizontally, the value of the display ID is increased or decreased by only 1, and when cursor keys are operated vertically, the value of the display ID is increased or decreased by only 3. Accordingly, in a two-dimensional multi-display configuration, display IDs are continuously set one after another. Specifically, display ID values 1 to 6 are respectively assigned to the displays 1-1 to 1-6 in turn.

Fourth Embodiment

Figure 10:
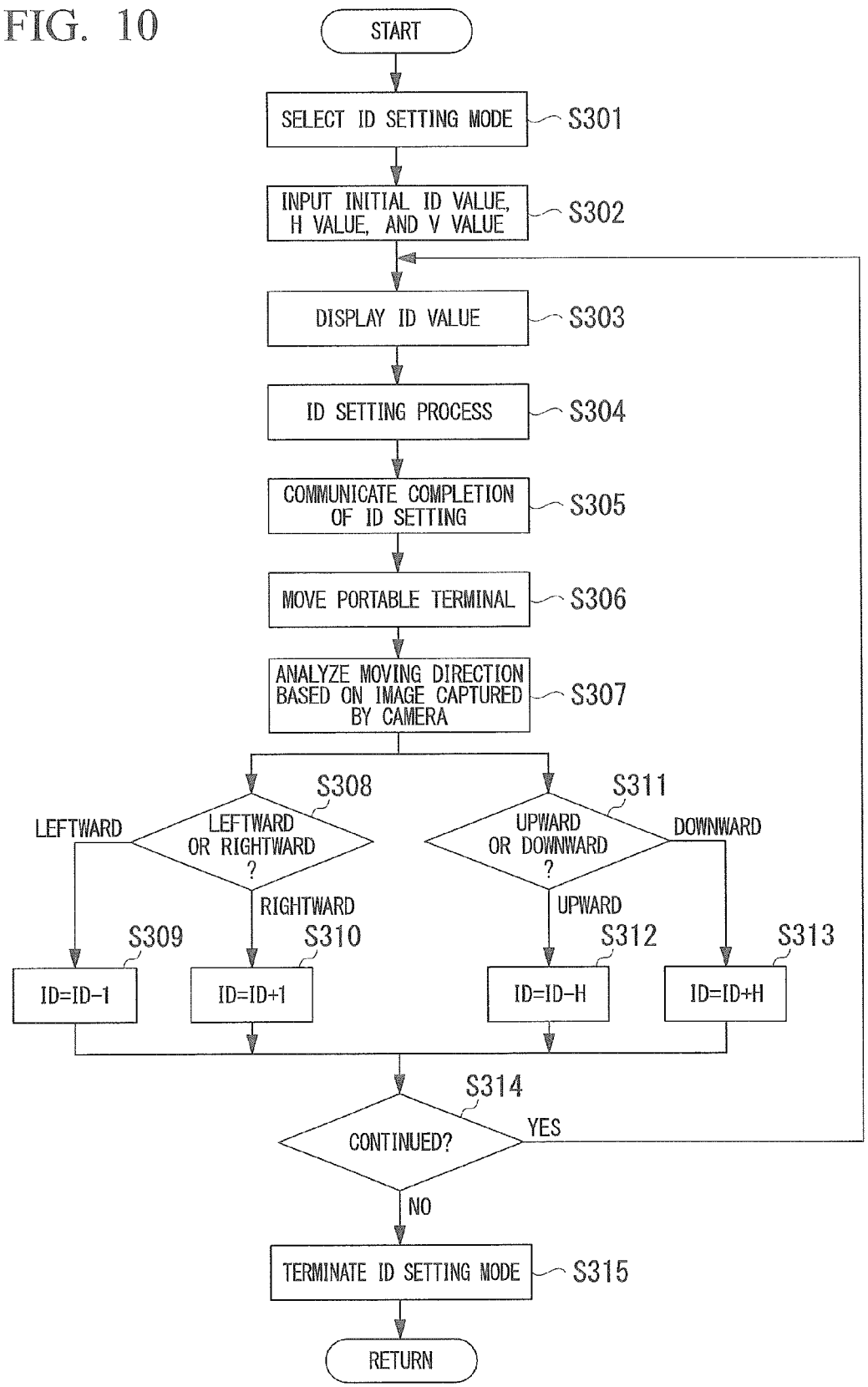
FIG. 10 is a flowchart in a fourth embodiment of the present invention, which shows the operation of the portable terminal for setting the display ID.

Next, a fourth embodiment of the present invention will be explained. FIG. 10 is a flowchart in the fourth embodiment of the present invention, which shows the operation of the portable terminal 3 for setting the display IDs of the displays 1-1 to 1-N that form the multi-screen system. In the above-described third embodiment, values of the display ID can be set, in turn, to two-dimensionally arranged multiple displays by operating the cursor keys vertically or horizontally. In the present embodiment, an image from the camera unit 59 is detected so as to assign the display IDs in turn to two-dimensionally arranged multiple displays without performing the cursor key operation.

In FIG. 10, the user selects an ID setting mode (see step S301) and inputs an initial value of the display ID, the number H of the displays arranged in the horizontal direction, and the number V of the displays arranged in the horizontal direction by operating the operation unit 53 (see step S302). For example, if displays 1-1 to 1-6 are arranged in a manner such that there are three displays in the horizontal direction and two displays in the vertical direction (see FIG. 2), the user inputs "3" for H and "2" for V in step S302.

After the relevant display ID is input, the main control unit 51 displays the input value of the display ID on the display unit 54 (see step S303). When the user brings the portable terminal 3 close to the display 1-1, the short distance radio communication is performed between the NFC transmission and reception unit 62 of the portable terminal 3 and the NFC transmission and reception unit 19 of the display 1-1 so that the initial value of the display ID (input in step S302) is transferred to the display 1-1 and the display ID setting process is executed (see step S304). After completing the display ID setting, the main control unit 51 informs the user of the completion of the setting by means of information display or sound (see step S305).

Figure 11A:
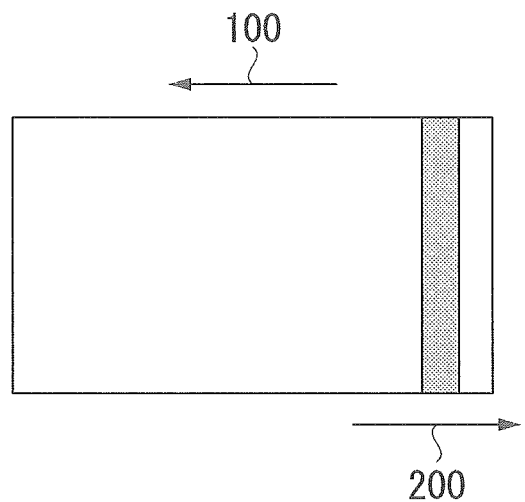
FIG. 11A is a diagram showing a moving direction analyzing process based on an image captured by a camera.
Figure 11B:
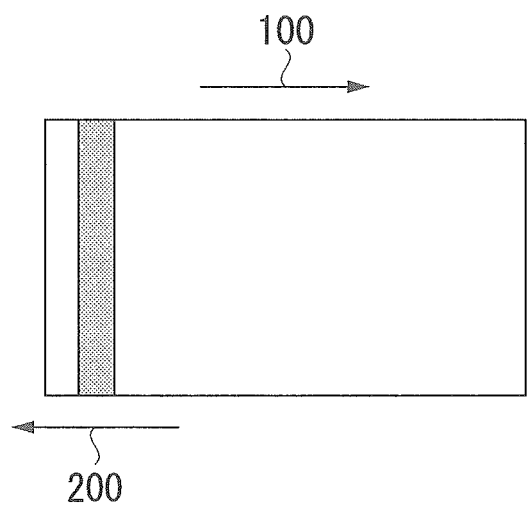
FIG. 11B is also a diagram showing the moving direction analyzing process based on an image captured by a camera.
Figure 11C:
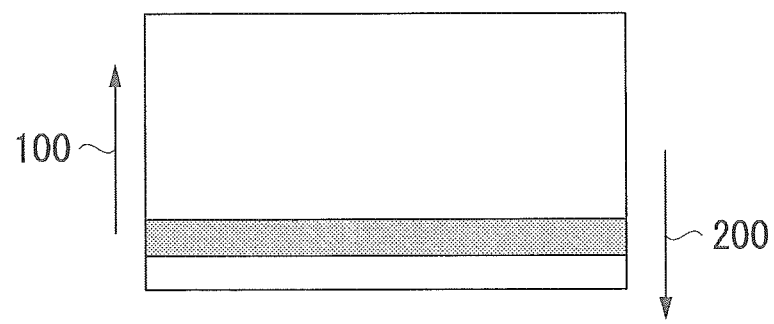
FIG. 11C is also a diagram showing the moving direction analyzing process based on an image captured by a camera.
Figure 11D:
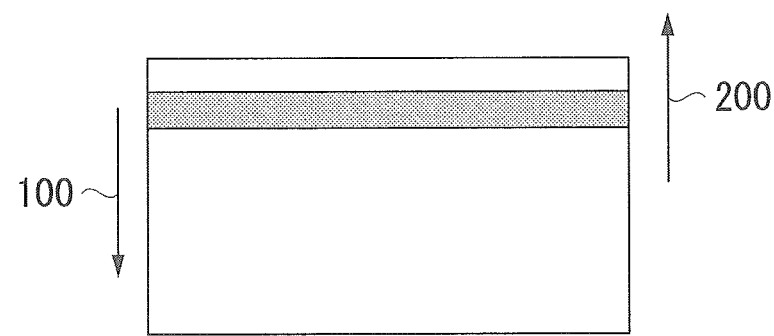
FIG. 11D is also a diagram showing the moving direction analyzing process based on an image captured by a camera.

When receiving the information that indicates the completion of the setting (see step S305), the user moves the portable terminal 3 toward a target display for the next ID setting (see step S306). In this process, the main control unit 51 analyzes to which display the portable terminal has been moved, based on an image captured by the camera unit 59 (see step S307). That is, if the portable terminal 3 is moved leftward (below, "direction 100" indicates the moving direction of the portable terminal), then as shown in FIG. 11A, an image of a bezel part (i.e., peripheral frame part) of a display moves rightward (below, "direction 200" indicates the moving direction of such a bezel image). If the portable terminal 3 is moved rightward (indicated by direction 100 in FIG. 11B), an image of a bezel part of a display moves leftward (indicated by direction 200). If the portable terminal 3 is moved upward (indicated by direction 100 in FIG. 11C), an image of a bezel part of a display moves downward (indicated by direction 200). If the portable terminal 3 is moved downward (indicated by direction 100 in FIG. 11D), an image of a bezel part of a display moves upward (indicated by direction 200).

The main control unit 51 analyzes whether the portable terminal 3 has been moved leftward or rightward based on the image captured by the camera unit 59 (see step S308). If the portable terminal 3 has been moved leftward, the main control unit 51 decreases the value of the display ID by only 1 (see step S309). If the portable terminal 3 has been moved rightward, the main control unit 51 increases the value of the display ID by only 1 (see step S310).

In addition, the main control unit 51 analyzes whether the portable terminal 3 has been moved upward or downward based on the image captured by the camera unit 59 (see step S311). If the portable terminal 3 has been moved upward, the main control unit 51 decreases the value of the display ID by the number H of the displays in the horizontal direction, which was set in step S302 (see step S312). If the portable terminal 3 has been moved downward, the main control unit 51 increases the value of the display ID by the number H of the displays in the horizontal direction (see step S313).

Then the main control unit 51 determines whether or not the display ID setting process is to be continued, based on a user input operation (see step S314). If the display ID setting process is continued (i.e., "YES" in step S314), the operation is returned to step S303. If the display ID setting process is not continued (i.e., "NO" in step S314), the ID setting mode is terminated (see step S315).

In the above-described embodiments, the portable terminal 3 is utilized as an ID setting device. Similar to the portable terminal 3, an NFC function may be installed in the remote controller 2, which is utilized to operate the displays 1-1 to 1-N, so as to perform the display ID setting by using the remote controller 2.

A program for executing all or part of the functions of the portable terminal 3 and the display 1 may be stored in a computer readable storage medium, and the program stored in the storage medium may be loaded and executed on a computer system, so as to perform the operation of each unit. Here, the computer system has hardware resources which include an OS and peripheral devices.

If the computer system employs a WWW system, the computer system can provide a homepage service (or viewable) environment.

The above computer readable storage medium is a storage device, for example, a portable medium such as a flexible disk, a magneto optical disk, a ROM, or a CD-ROM, or a memory device such as a hard disk built in a computer system. The computer readable storage medium also covers (i) a device for dynamically storing the program for a short time, such as a communication line used when sending the program via a network (e.g., the Internet) or a communication line (e.g., a telephone line), (ii) or a device for temporarily storing the program, such as a volatile storage medium in a computer system which functions as a server or client for such a program transmission. In addition, the program may execute part of the above-explained functions, or may be a program by which the above-described functions can be executed by a combination program of this program and an existing program which has already been stored in the relevant computer system.

The embodiments of the present invention have been explained in detail with reference to the drawings. However, concrete structures are not limited to the embodiments and also include design modifications or the like, within the scope of the present invention.

Although all or part of the above-described embodiment can be described as follows, the present invention is not limited to the following.

Supplement 1
   A multi-screen display system that includes a plurality of display devices and an ID setting apparatus, wherein:
   the ID setting apparatus comprises:
   a generation unit that generates display IDs; and
   a first short distance radio communication unit that transmits the display IDs generated by the generation unit to the display devices via short distance radio communication; and
   each display device comprises:
   a second short distance radio communication unit that receives the relevant display ID from the ID setting apparatus via the short distance radio communication; and
   a storage unit that stores the received display ID.

Supplement 2
   The multi-screen display system in accordance with Supplement 1, wherein:
   the ID setting apparatus has an operation unit configured to input a display ID; and
   the generation unit generates display IDs according to each operation that is input utilizing the operation unit.

Supplement 3
   The multi-screen display system in accordance with Supplement 1, wherein:
   the ID setting apparatus has an operation unit configured to input a display ID; and
   the generation unit generates a display ID according to an operation that is input utilizing the operation unit and another display ID produced utilizing the generated display ID as an initial value.

Supplement 4
   The multi-screen display system in accordance with Supplement 1, wherein:
   the ID setting apparatus has an operation unit that accepts an input operation of a display ID and an input operation in vertical and horizontal directions; and
   the generation unit generates a display ID according to an operation that is input utilizing the operation unit and another display ID produced utilizing the generated display ID as an initial value and according to an operation in the vertical and horizontal directions, that is input utilizing the operation unit.

Supplement 5
   The multi-screen display system in accordance with Supplement 1, wherein:
   the ID setting apparatus has an operation unit configured to input a display ID and a camera unit; and
   the generation unit generates a display ID according to an operation that is input utilizing the operation unit and another display ID produced utilizing the generated display ID as an initial value and according to whether or not a relative position between the ID setting apparatus and the display devices moves horizontally or vertically, which is determined based on an image signal captured utilizing the camera unit.

Supplement 6
   A display device in a multi-screen display system that includes a plurality of display devices and an ID setting apparatus, wherein the display device comprises:
   a short distance radio communication unit that receives a display ID generated by the ID setting apparatus via said ID setting apparatus and short distance radio communication; and
   a storage unit that stores the received display ID.

Supplement 7
   An ID setting apparatus in a multi-screen display system that includes a plurality of display devices and the ID setting apparatus, wherein the ID setting apparatus comprises:
   a generation unit that generates display IDs; and
   a short distance radio communication unit that transmits the display IDs generated by the generation unit to the display devices via short distance radio communication.

Supplement 8
   An ID setting method utilized in a multi-screen display system that includes a plurality of display devices and the ID setting apparatus, wherein:
   the ID setting apparatus:
   generates display IDs; and
   transmits the generated display IDs to the display devices via short distance radio communication; and
   each display device:
   receives the relevant display ID from the ID setting apparatus via the short distance radio communication; and
   stores the received display ID.

REFERENCE SYMBOLS 1, 1-1 to 1-N display
2 remote controller
3 portable terminal
14 control unit
19 NFC transmission and reception unit
51 main control unit
53 operation unit
54 display unit
59 camera unit
62 NFC transmission and reception unit

The invention claimed is:
1. A multi-screen display system that includes a plurality of display devices and an ID setting apparatus, wherein:
   the ID setting apparatus comprises:
   a generation unit that generates display IDs; and
   a first short distance radio communication unit that transmits the display IDs generated by the generation unit to the display devices via short distance radio communication; and
   each display device comprises:
   a second short distance radio communication unit that receives the relevant display ID from the ID setting apparatus via the short distance radio communication; and a storage unit that stores the received display ID; and
   wherein: the ID setting apparatus has an operation unit configured to input a display ID and a camera unit; and
   the generation unit generates a display ID according to an operation that is input utilizing the operation unit and another display ID produced utilizing the generated display ID as an initial value and according to whether a relative position between the ID setting apparatus and the display devices moves horizontally or vertically, which is determined based on an image signal captured utilizing the camera unit.

* * * * *